United States Patent
Kosmowski

[15] 3,672,256
[45] June 27, 1972

[54] CENTRIFUGAL CHUCK DEVICE

[72] Inventor: Wojciech B. Kosmowski, Covina, Calif.

[73] Assignee: Advanced Controls Corporation, Pico Rivera, Calif.

[22] Filed: Nov. 9, 1970

[21] Appl. No.: 87,992

[52] U.S. Cl..............................90/11 A, 279/1 B, 279/1 C, 279/46, 279/103, 279/104
[51] Int. Cl........................................B23c 5/26, B23b 31/04
[58] Field of Search..................90/11 A; 279/1 B, 1 C, 15 G, 279/102, 23, 96, 104, 103, 41, 89, 90, 46

[56] References Cited

UNITED STATES PATENTS 3,168,322  2/1965  Dziedzic............................90/11 A X
2,356,245  8/1944  Johnston..............................279/1 C Primary Examiner—Gil Weidenfeld
Attorney—Newton H. Lee, Jr.

[57] ABSTRACT

Centrifugal force responsive means for holding a tool in the bore of a spindle, in which the tool is carried by a tool holder insertable into and removable from the spindle bore, the tool holder having an inner end provided with a cavity, and a chuck being disposed in the spindle bore and having spring fingers, the ends of which engage in the cavity of the tool holder to initially hold the tool holder in the spindle, and the gripping action of the chuck fingers is increased by centrifugal force.

11 Claims, 4 Drawing Figures

PATENTED JUN 27 1972   3,672,256
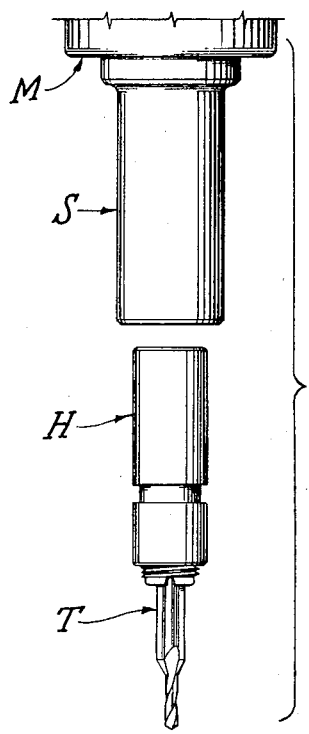
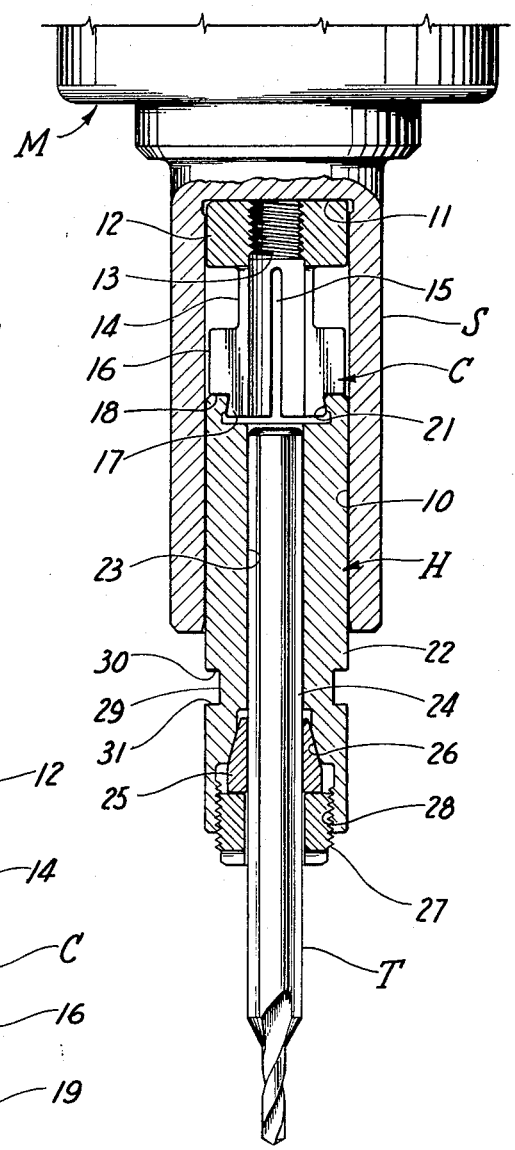
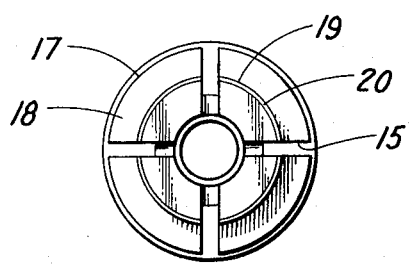
INVENTOR.
WOJCIECH B. KOSMOWSKI
BY

CENTRIFUGAL CHUCK DEVICE

BACKGROUND OF THE INVENTION

In the manufacture of various articles requiring the use of a machine tool in which a tool is held by a chuck, it frequently becomes necessary that the tool be changed. Such change requires that the machine tool be shut down for the period of time necessary to effect the change. If the machine is of the multi-spindle type, say a multiple spindle drill press in which all of the drills in the spindles are changed periodically, the lapsed time when the machine is shut down may be very extensive and, thus, very expensive in respect of the unit cost of the useful work performed by the machine.

In order to avoid excessive shut down time, an approach to the problem has involved the utilization of multiple drills in turrets which may be shifted through a series of successive stations so that the shut down time is reduced to the period of time required to change stations, but this leads to substantial initial cost of the machinery.

In addition to the foregoing, alignment and depth of penetration within acceptable tolerances are serious problems in the efficient use of machine tools such as drill presses employed in the drilling of holes in precision devices, particularly devices in which a number of holes are drilled simultaneously. Indeed, the combined cost of shut down time during drill change and establishment of precise alignment of the drills may become substantially intolerable, so that there has long been a need for means which enable the rapid change of tools in a drill press whereby the tools may not only be rapidly changed, but may also be precisely aligned coaxially with the spindle and precisely positioned to effect the desired penetration.

In the past, efforts have been made to accomplish the rapid and accurate change of drills in drill presses by the provision of various centrifugally operated chucks or collets. For example, it is known to provide a gripping device within the spindle of high speed dental drills by longitudinally slotting a tubular member and forming its ends so that segments of the slotted member form levers, weighted ends of which are rocked by centrifugal force about a fulcrum which engages the inside of the spindle to effect a grip on the shank of a dental burr by gripping ends of the levers. In addition, it has been proposed that a tool such as a drill be initially combined with a separate member constituting a collet which is insertable into a bore of a spindle, the collet having integral fingers which are expanded by centrifugal force into engagement with the spindle wall.

Such prior devices inherently experience problems in respect of tool alignment, balance, and positioning, and more particularly, the centrifugally operable collets must be employed in large numbers, due to the fact that the collet is initially combined with the drill or tool, thus, requiring precision manufacture of a large number of collets.

SUMMARY OF THE INVENTION

The present invention provides a chuck or gripping device of the centrifugally operated type adapted to be combined with the spindle of a rotary machine tool and adapted to automatically engage a holder for a tool which is inserted into the spindle.

More particularly, the invention provides a means whereby the tool may be combined with a holder and kept in readiness for installation in the spindle upon removal of a similar holder from the spindle. The tool holder and the chuck or gripping device are so constructed that the accuracy of positioning and concentricity of the tool as well as proper balance are assured. In addition, the chuck or gripping device comprises a plurality of integrated flexible arms, end portions of which engage in a socket or recess in the inner end of the tool holder, whereby centrifugal force caused by rotation of the spindle automatically causes the fingers to grip the tool holder and cause corresponding rotation of the latter. With such a combination, the tool holder is a comparatively simple device which can be inexpensively made in quantities which will enable the maintenance of a suitable number of tool holders and tools in readiness for installation into the machine tool spindle; whereas, the more complex chuck or gripping device remains in place in the spindle.

This invention possesses many other advantages, and has other purposes which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

BRIEF DESCRIPTION OF THE DRAWINGS

FIG. 1 is a side elevation showing a machine tool spindle and a tool holder and tool to be associated with the spindle;

FIG. 2 is an enlarged view, partly in vertical section and partly in elevation, showing the tool holder and tool engaged with the chuck in the spindle;

FIG. 3 is a detailed view in side elevation and on an enlarged scale, showing the centrifugal chuck; and FIG. 4 is an end elevation of the chuck of FIG. 3.

DESCRIPTION OF THE PREFERRED EMBODIMENT

As seen in the drawings, a spindle S is provided as a portion of a machine tool M adapted to receive a tool holder H which carries a tool T in the form of a drill. The machine tool M, without requiring further illustration, may be of the well known type in which the spindle S essentially constitutes a portion of a rotor of a high speed electrical motor, whereby the spindle is adapted to be rotated a number of thousands of revolutions per minute, as is the case of well known high speed precision drill presses, which may comprise a plurality of spindles S, each driven by its own motor and combined in a drill press so that the plurality of the drills or tools T will be moved simultaneously into engagement with a part to be drilled. It is in connection with the operation of such high speed precision drills that the problem of frequent tool change of a number of tools and the requirement of precise alignment and balance are most pronounced, since substantial down time of the machine and skilled labor in changing the tools have heretofore been involved.

Referring to FIG. 2, the spindle S will be seen to comprise a cylindrical bore 10 terminating in an inner wall 11 which is normal to the axis of the spindle. Within the spindle bore 10 is a gripping device or chuck C which engages the inner end of the tool holder H to retain the latter in the bore 10 during use of the tool T.

Referring more particularly to the chuck C, it will be seen that it is of unitary construction and includes an inner annular end section or portion 12 sized to be press fit into the bore 10 and into abutting engagement with the wall 11. The end section 12 is drilled and tapped as at 13 to enable installation and removal of the chuck C by use of a threaded tool (not shown), as is obvious. Extending longitudinally from and integral with the end section 12 is a plurality of circumferentially spaced resilient finger portions 14 which are spaced apart by elongated slots 15 extending longitudinally from the free ends of the fingers 14 substantially to the flexible juncture of the fingers 14 with the end section 12. Each of the fingers has in spaced relation to the end section 12 a radially enlarged weight portion 16, the diametrical distance across the weight portions being less than the diameter of the bore 10. At the free ends of the fingers 14, the fingers each have a gripping portion 17 extending axially from a wall 18 which is normal to the axis of the chuck. The gripping portions 17 flare slightly from the wall 18 to a juncture 19 with a chamfer 20. In effect, the gripping portions 17 combine to form a short frustum of a long cone.

Tool holder H, at its inner end, has an annular cavity defined by a wall 21 which is also a frustum of a long cone generally corresponding to that provided by the end portions 17 of the chuck C, so that when the holder H is inserted into the spindle bore 10, as seen in FIG. 2, the end portions 17 engage with the wall 21 of the holder H, the dimensions being such that fingers 14 are initially at least slightly stressed inwardly to establish initial gripping contact of the portions 17 of the collet with the wall 21 of the tool holder H. In this connection, the chamfer 20 facilitates inward deflection of the fingers 14 as the ends 17 of the latter are forced into the end of the tool holder H upon insertion of the tool holder into the spindle S.

The tool holder H comprises an elongated cylindrical body 22 having a central bore 23 adapted to receive the shank 24 of the tool of drill T. At its other end, the body 22 is provided with means for gripping the tool shank 24 and centralizing it. This means comprises a tapered bushing 25 engageable in a tapered seat 26 and adapted to be forced inwardly to grip the tool shank 24 and centralize the latter by a nut 27 which is threaded as at 28 into the end of the body 22. Other means may be utilized to retain the tool T in the holder H, but preferably such means also should centralize the tool T with respect to the holder body 22.

In order to facilitate inserting of the holder H into the bore 10 of the spindle S and into engagement with the chuck C, as well as to facilitate removal of the holder H from the spindle S, the body 22 at a location external of the spindle S is provided with means engageable by a suitable changing tool or automatic apparatus. Thus, the body 22 in the illustrated embodiment has an annular groove 29 providing a first shoulder 30 facing outwardly with respect to the spindle S and a second shoulder 31 facing inwardly with respect to the spindle S, these shoulders enabling the application of an endwise force to the holder body 22 by tool changing apparatus as referred to above.

While the specific details of the illustrative embodiment of the invention have been described, it will be appreciated that changes or alterations may be resorted to. The essence of the invention resides in the fact that the chuck C is installed in and remains in the spindle S unless damage or wear requires replacement, and provides flexible fingers 14 having sufficient mass in the weighted portions 16 to produce substantial centrifugal force, in response to high speed spindle rotation, to cause the gripping portions 17 of the fingers 14 to tightly engage within the end cavity of the tool holder H, so that rotation is effectively transmitted to the tool T. However, the holder H may be readily removed from the spindle S and be replaced by a similar holder having a new tool T. Since inward movement of the holder H into the spindle bore 10 is limited by abutting engagement of the holder H with the walls 18, the groove 29 is positively located to facilitate manipulation of the holder H by automatic machinery, if desired. Such precise positioning of the tool holder H also allows the tool T to be precisely located with respect to the holder H so that the penetration of the drill into a work piece will be predetermined.

I claim:

1. A chuck device comprising: a rotatable spindle having a bore coaxial with the axis of rotation, a chuck in said bore having a plurality of circumferentially spaced elongated and resilient fingers, said fingers including means being responsive to centrifugal force to urge the free ends of said fingers outwardly, a holder in said bore, said holder and said fingers having coengaged portions confining said fingers against outward movement upon rotation of said spindle, and said holder having means for supporting a member to be rotated.

2. A chuck device as defined in claim 1, wherein said chuck comprises an end section from which said fingers extend and with which said fingers are integral, said fingers being relatively thin and flexible at the juncture with said end section, and said fingers having weight portions adjacent the free ends of said fingers and responsive to centrifugal force to urge the free ends of said fingers outwardly, said portions of said fingers coengageable with said holder being at the free ends of said fingers.

3. A chuck device as defined in claim 1, wherein said chuck comprises an end section from which said fingers extend and with which said fingers are integral, said fingers being relatively thin and flexible at the juncture with said end section, and said fingers having weight portions adjacent the free ends of said fingers and responsive to centrifugal force to urge the free ends of said fingers outwardly, said portions of said fingers coengageable with said holder being at the free ends of said fingers, said weight portions having end faces engageable by said holder.

4. A chuck device as defined in claim 1, wherein said chuck comprises an end section from which said fingers extend and with which said fingers are integral, said fingers being relatively thin and flexible at the juncture with said end section, and said fingers having weight portions adjacent the free ends of said fingers and responsive to centrifugal force to urge the free ends of said fingers outwardly, said portions of said fingers coengageable with said holder being at the free ends of said fingers, said holder having a cavity in an end thereof bordered by a wall cooperative with said coengaged portions of said fingers to grip said holder responsive to centrifugal force.

5. A chuck device as defined in claim 1, wherein said chuck comprises an end section from which said fingers extend and with which said fingers are integral, said fingers being relatively thin and flexible at the juncture with said end section, and said fingers having weight portions adjacent the free ends of said fingers and responsive to centrifugal force to urge the free ends of said fingers outwardly, said portions of said fingers coengageable with said holder being at the free ends of said fingers, said portions at the free ends of said fingers coengageable with said holder being initially flexed inwardly to initially retain said holder connected to said chuck.

6. A chuck device as defined in claim 1, wherein said holder is provided with means external of said spindle for accomodating a tool for inserting said holder into said spindle and pulling said holder from said spindle.

7. A chuck device as defined in claim 6, wherein said means for accomodating a tool comprises oppositely facing shoulders on said holder.

8. A chuck device as defined in claim 1, wherein said chuck is press fit in said bore, and includes means connectable to a pulling tool to remove said chuck from said bore.

9. A chuck device as defined in claim 1, wherein said holder has a central opening and means for centralizing and holding a shank in said opening.

10. A chuck device comprising: a rotatable spindle having a bore coaxial with the axis of rotation, chuck means in said bore including a plurality of circumferentially spaced elongated and resilient fingers, said fingers including means being responsive to centrifugal force to urge the free ends of said fingers outwardly, and said free ends each of said fingers having means engageable in a cavity of a holder in the bore of said spindle for retaining the holder in the bore and for rotating said holder in response to rotation of said spindle.

11. A chuck device as defined in claim 10, wherein said chuck comprises an end section from which said fingers extend and with which said fingers are integral, said fingers being relatively thin and flexible at the juncture with said end section, and said fingers having weight portions adjacent the free ends of said fingers and responsive to centrifugal force to urge the free ends of said fingers outwardly.

* * * * *